United States Patent
Bell

(10) Patent No.: US 6,561,024 B2
(45) Date of Patent: May 13, 2003

(54) METHOD AND APPARATUS FOR CREATING CLEARANCE BETWEEN TWO POINTS

(75) Inventor: Aaron Bell, Ankeny, IA (US)

(73) Assignee: Sauer-Danfoss, Inc., Ames, IA (US)

( * ) Notice: Subject to any disclaimer, the term of this patent is extended or adjusted under 35 U.S.C. 154(b) by 72 days.

(21) Appl. No.: 09/789,264

(22) Filed: Feb. 20, 2001

(65) Prior Publication Data

US 2002/0112551 A1 Aug. 22, 2002

(51) Int. Cl.[7] ............... G01D 11/24; G01D 18/00; G01P 11/02; G01P 21/02
(52) U.S. Cl. ............... 73/431; 73/637; 73/494; 73/866.5
(58) Field of Search ............... 73/431, 494, 866.5, 73/168, 1.37, 1.41, 1.01, 493

(56) References Cited

U.S. PATENT DOCUMENTS

| | | | |
|---|---|---|---|
| 3,418,456 A | * 12/1968 | Hamisch et al. | ............ 235/454 |
| 3,981,194 A | * 9/1976 | Blise et al. | ............ 73/861.78 |
| 4,017,756 A | * 4/1977 | Davidson | ............ 310/168 |
| 4,401,282 A | * 8/1983 | Miki | ............ 242/384.2 |
| 4,655,689 A | 4/1987 | Westveer et al. | ............ 417/53 |
| 4,717,322 A | 1/1988 | Masuda et al. | ............ 418/78 X |
| 4,922,197 A | 5/1990 | Juds et al. | ............ 324/207.21 |
| 5,325,055 A | 6/1994 | Geringer | ............ 324/173 |
| 5,351,555 A | 10/1994 | Garshelis | ............ 73/862.335 |
| 5,850,046 A | * 12/1998 | Slates et al. | ............ 73/866.5 |
| 5,936,397 A | 8/1999 | Benkert et al. | ............ 324/173 |

FOREIGN PATENT DOCUMENTS

| | | | | |
|---|---|---|---|---|
| DE | 3515436 | * | 10/1986 | ............ B21B/31/32 |
| GB | 2348933 | * | 10/2000 | ............ F16D/66/00 |

* cited by examiner

Primary Examiner—Thomas P. Noland

(57) ABSTRACT

A method and apparatus for creating a finite clearance space between two parts under blind assembly conditions involves threading an elongated sensor into a housing containing the part to be sensed by first placing a spacer element on an operative surface of the sensor wherein the spacer element has a radial thickness equal to the finite clearance space. The sensor is screwed unto the housing in a radial direction towards the operative surface of the sensor until the spacer element engages the operative surface, thereby specifically locating the operative surface a precise radial distance from the operative surface.

9 Claims, 2 Drawing Sheets

METHOD AND APPARATUS FOR CREATING CLEARANCE BETWEEN TWO POINTS

BACKGROUND OF THE INVENTION

Measuring the rotational speed of a shaft is a need for many customers of hydraulic/hydrostatic pumps and motors. One method of doing this is to affix a ring to the shaft, or something rotating with a constant ratio to shaft, that has several equally spaced magnetic poles. A Hall Effect sensor can then be placed in proximity to the magnetic ring. The Hall Effect sensor can detect the rate at which the magnetic poles pass by, providing enough information to calculate the rotational speed of the shaft. The applications of this technology are many, including engine speed and ground speed. A challenge that exists when assembling the hydraulic/hydrostatic pump or motor is to accurately and consistently place the sensor at the correct location, related to the magnetic ring. If the sensor is too close, it may come in contact with the ring during operation due to shaft deflection, tolerance issues, or other reasons. This may cause damage to the sensor, the magnetic ring, or both parts. If the sensor is placed further away, the magnetic field created by each pole on the magnetic ring will be weaker, reducing the Hall Effect and making the sensor less accurate, especially at high rotational speed. If the sensor is to work correctly, therefore, correct placement is crucial In most applications, the Hall Effect sensor is placed in a threaded housing, then screwed into the pump or motor's external housing until the desired clearance is reached. Unfortunately, this assembly procedure is a blind operation, meaning that it is impossible to directly measure the clearance. One way to establish the correct distance is to screw in the sensor until it touches the magnetic ring, then unscrew it a defined number of rotations (based on thread pitch). This process relies heavily on operator knowledge and skill.

It is therefore a principal object of this invention to provide a method and means of creating a clearance or free space between two parts under blind assembly conditions.

A further object of the invention is to provide a method and means of creating a clearance or free space between two parts under blind assembly conditions which is fast and accurate to implement.

These and other objects will be apparent to those skilled in the art.

SUMMARY OF THE INVENTION

A method for creating a finite clearance space between two parts under blind assembly conditions involves threading an elongated sensor into a housing containing the part to be sensed by first placing a spacer element on an operative surface of the sensor wherein the spacer element has a radial thickness equal to the finite clearance space. The sensor is screwed unto the housing in a radial direction towards the operative surface of the sensor until the spacer element engages the operative surface, thereby specifically locating the operative surface a precise radial distance from the operative surface.

To resolve the placement issue, this invention applies a material to the end of the sensor that has thickness equaling the optimum distance between the magnetic ring and the sensor. With this insert, operators are no longer required to unscrew the sensor to establish an acceptance distance. The sensor can simply be screwed in until the applied material (spacer) touches the item being sensed. The spacer is not a functional part of the sensor, so if it contacts the ring during operation, causing part or all of it to wear away, there are no adverse consequences.

DESCRIPTION OF THE PREFERRED EMBODIMENT

Figure 1:
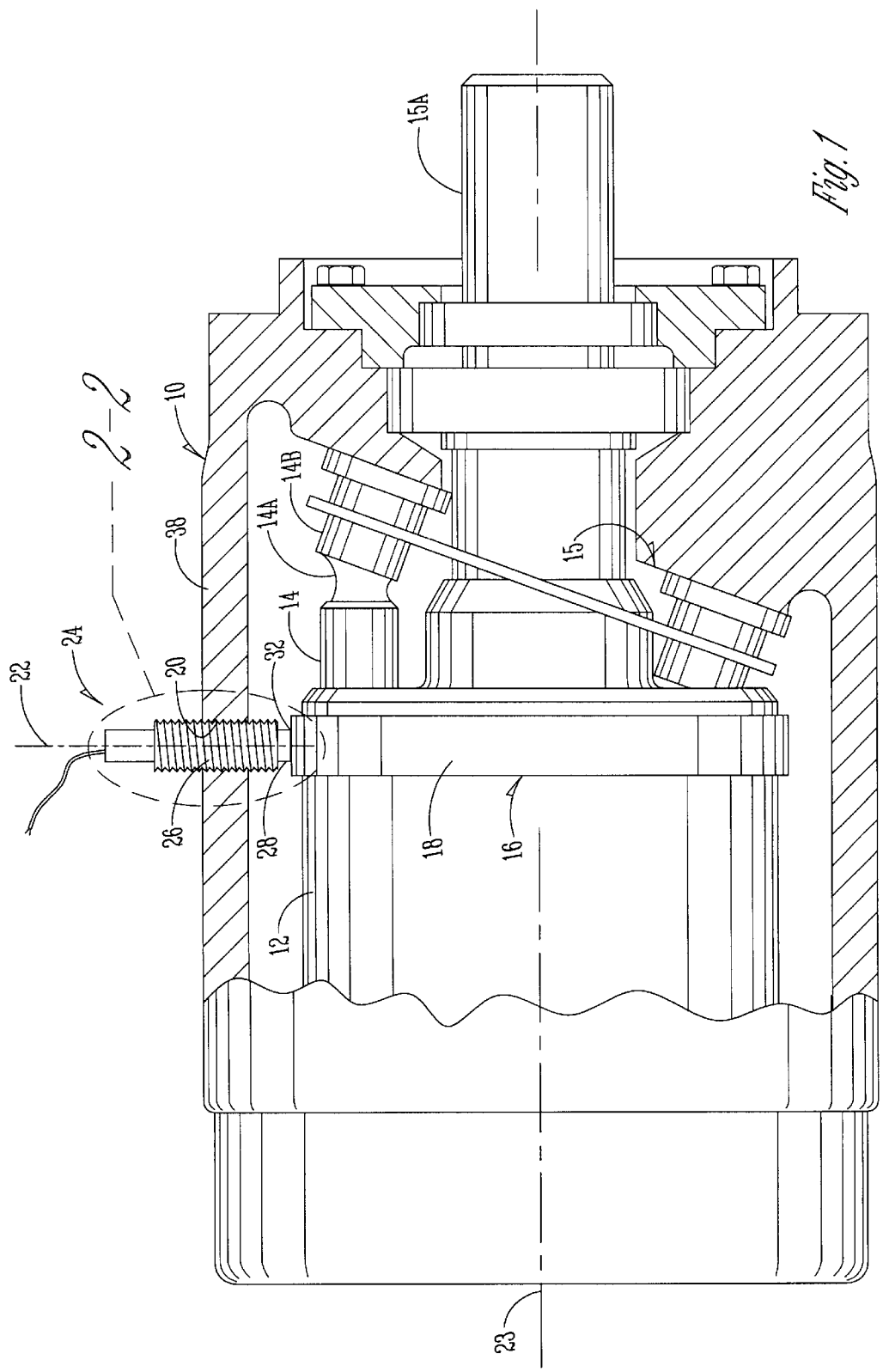
FIG. 1 is a sectional view through a motor housing showing a sensor and an object to be sensed with a spacer element of this invention in its operative position.

FIG. 1 shows a conventional hydrostatic motor housing 10 which rotably contains a rotatable cylinder block 12 which has a plurality of movable pistons 14 which are spring-urged towards swashplate 15. Each piston has an outwardly extending ball 14A which is rotatably received in coupler 14B. The cylinder block drives the output shaft 15A. During assembly, a speed sensing ring 16 of the type shown in U.S. Pat. No. 5,325,055 is rigidly secured to block 12. Ring 16 has an outer peripheral surface 18 which is the surface to be sensed.

Figure 2:
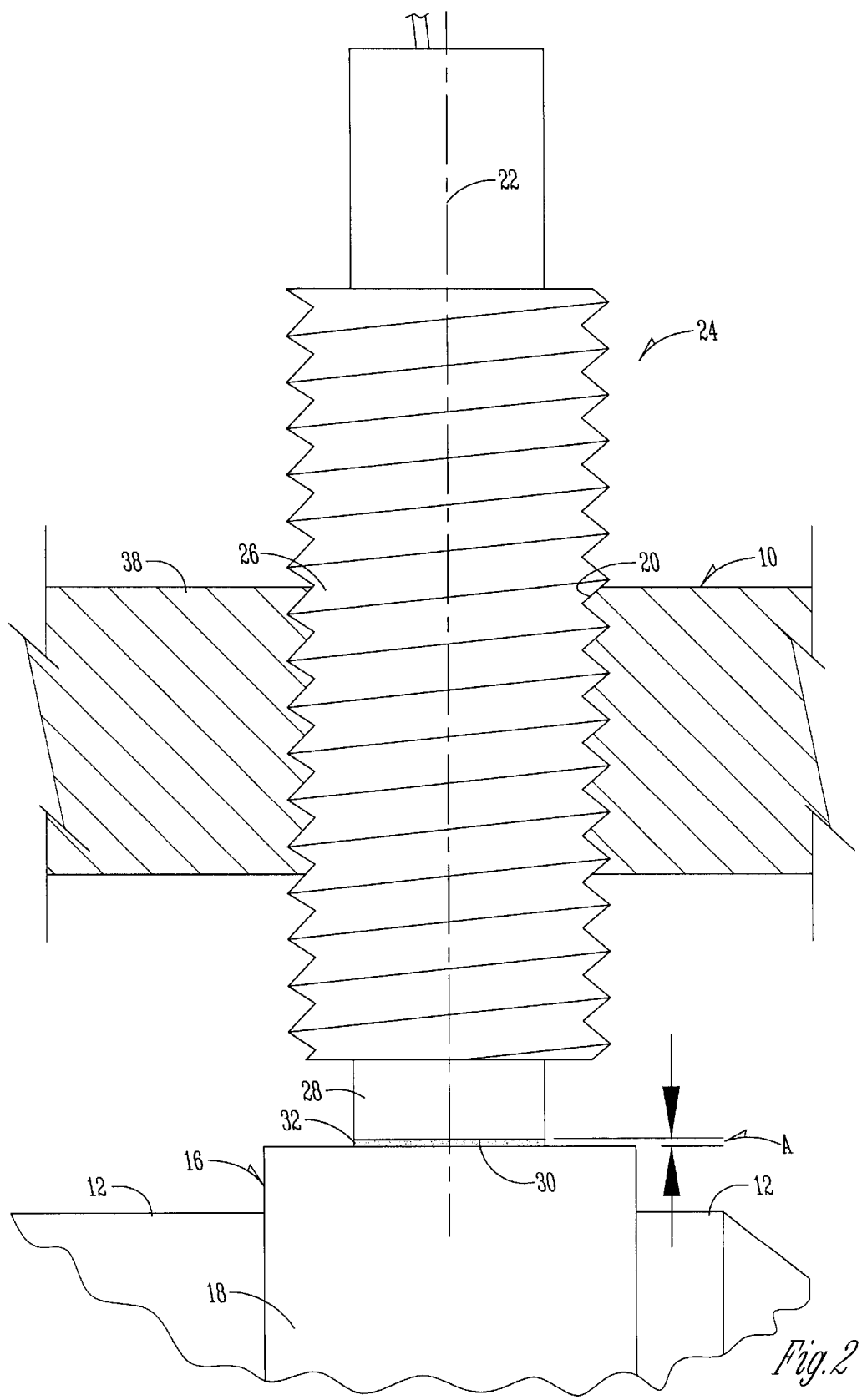
FIG. 2 is an enlarged scale view of portion 2—2 of FIG. 1.

The housing 10 has a threaded aperture 20 with a radial axis 22 which intersects the center axis 23 of block 12. A Hall Effect sensor 24 with a threaded shoulder 26 which is threadably mounted in aperture 20. Sensor 24 has an operating probe 28 and a sensing surface 30 on its inner end. (FIG. 2). The predetermined design of the apparatus determines that the optimum radial distance between the sensing surface 30 and the peripheral surface 18 of ring 16 has a radial magnitude of A (e.g., 0.030 in.).

A disposable spacer element 32 is secured to the sensing surface 30 of sensor 24 and has a predetermined thickness of A. Spacer element 32 is secured to surface 30 of sensor 34 in any convenient manner before the sensor is threaded into aperture 20. The diameter or area of the probe 28 and spacer element 32 must be less than the diameter of the shoulder 26 and the aperture 20 so as to permit the entry thereof through aperture 20. The material of sacrificial spacer element 32 should be non-magnetic, and should be firm but capable of eroding upon the rotation of ring 16. A suitable material is Syntheseal® N-8094 made by Interface Solutions, Inc. Any suitable adhesive (e.g. MACbond 18-1192 made by Mactac of Stowe, Ohio) can be used to affix spacer element 32 to surface 30. The radial thickness of spacer element 32 is typically only a few thousandths of an inch (e.g., 0.030 inches).

In operation, the sensor 24 is screwed into aperture 20 until spacer element 32 engages the outer peripheral surface 18 of ring 16. The operator will then cease screwing the sensor 24 into the aperture 20. The matching threads on shoulder 26 and in aperture 20 will normally hold the sensor 24 in place. A nut or fastening means (not shown), on sensor 24 can also be used for this purpose. This process will locate the surface 30 the predetermined radial distance A from the outer surface 18 of ring 16. The block 12 within housing 10 can then be operated and rotated, and the sensor 24 will be accurately positioned with respect to speed ring 16 even though assembly of the sensor 24 was done under "blind" conditions. The erosion of sacrificial spacer element 32 will take place harmlessly.

It is therefore seen that this invention will accomplish its stated objectives.

What is claimed is:

1. A closed housing having a blindly located sensor to sense the activity of an internal part not visible from the exterior of the closed housing, comprising, a closable opening in the housing, a longitudinal sensor probe mounted within the opening and extending into the housing and having an inner end, a spacing element secured to the inner end of the probe and adapted to engage the internal part during installation of the sensor probe and to wear apart from the internal part, the thickness of the spacing element being the optimal distance that the inner end of the probe should be spaced from the internal part to permit the sensor probe to operationally sense the activity of the internal part.

2. The method of claim 1 wherein the internal sensing surface is a rotatable member.

3. The device of claim 2 wherein the sensor probe and the rotable member have intersecting center axes.

4. The method of claim 1 wherein the material of the spacing element is sacrificial in nature.

5. The device of claim 1 wherein the predetermined longitudinal distance is a radial distance measured along the center axis of the sensor probe.

6. A closed housing having a blindly located sensor to sense the activity of an internal part not visible from the exterior of the closed housing, comprising, a closable opening in the housing, a longitudinal sensor probe mounted within the opening and extending into the housing and having an inner end, a sacrificial spacing element secured to the inner end of the probe and adapted to engage the internal part during installation of the sensor probe to fix a spaced position of the sensor from the internal part, the thickness of the spacing element being the optimal distance that the inner end of the probe should be spaced from the internal part to permit the sensor probe to operationally sense the activity of the internal part.

7. The device of claim 6 wherein the internal sensing surface is a rotatable member.

8. The device of claim 7 wherein the sensor probe and the rotable member have intersecting center axes.

9. The device of claim 6 wherein the predetermined longitudinal distance is a radial distance measured along the center axis of the sensor probe.

* * * * *